June 29, 1926.

A. A. BENEDICT 1,590,613

THERMOMETER

Filed May 22, 1925

Inventor
A. A. Benedict
By C. A. Snowles
Attorney

Patented June 29, 1926.

1,590,613

UNITED STATES PATENT OFFICE.

ADELBERT ANDREW BENEDICT, OF NEW YORK, N. Y., ASSIGNOR OF ONE-THIRD TO DANIEL A. BRIDGE AND ONE-THIRD TO JAMES DARMODY, BOTH OF NEW YORK, N. Y.

THERMOMETER.

Application filed May 22, 1925. Serial No. 32,200.

This invention relates to thermometers, steam and water gauges or the like, and aims to provide a novel form of transparent casing whereby the mercury or liquid in the device will be greatly magnified, to the end that the device may be readily and easily read.

Another important object of the invention is to provide a device of this character wherein the fluid tube together with the markings or graduations employed in connection therewith will be completely housed to protect them from the weather.

A still further object of the invention is the provision of a transparent casing having a magnifying portion moulded therewith.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
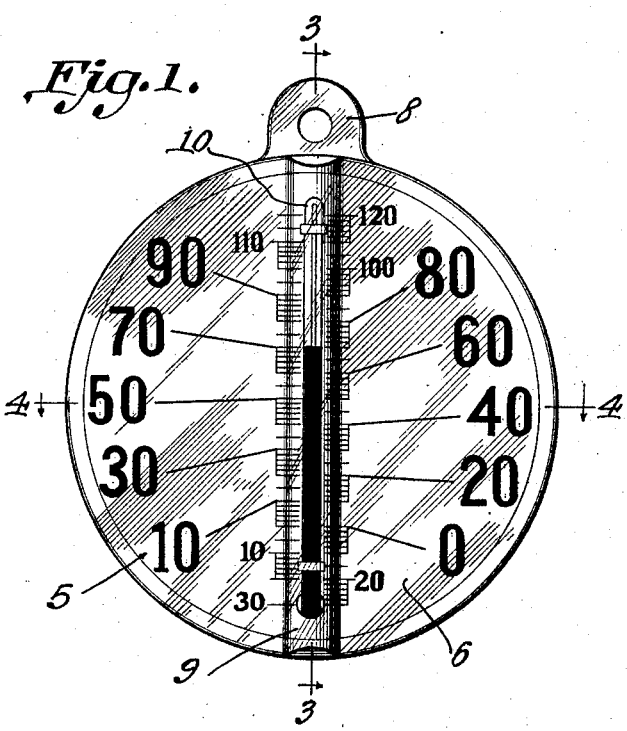
Figure 1 is a front elevational view of a thermometer constructed in accordance with the invention.
Figure 2:
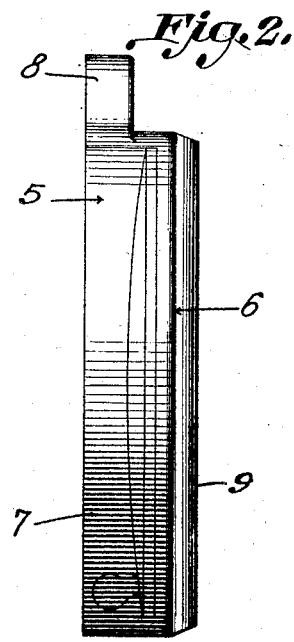
Figure 2 is a side elevational view thereof.
Figure 3:
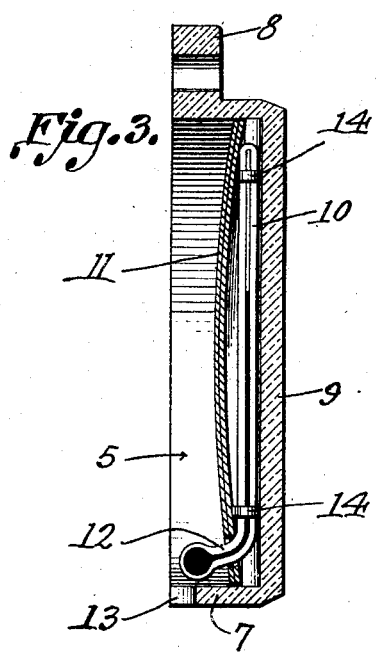
Figure 3 is a sectional view taken on line 3—3 of Figure 1.
Figure 4:
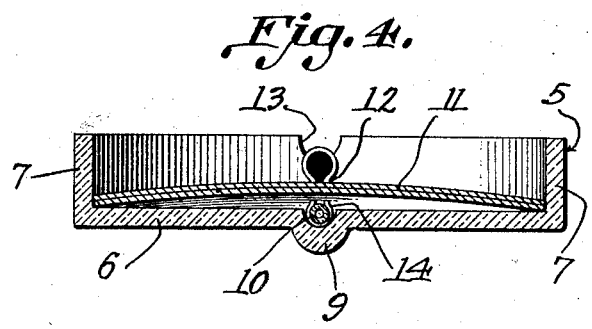
Figure 4 is a sectional view taken on line 4—4 of Figure 1.

Referring to the drawing in detail, the casing is indicated generally by the reference character 5 and is constructed of transparent material such as glass or the like, and as shown the casing includes a front wall 6 and a rearwardly extended circular wall 7 there being provided an integral ear 8 formed with an opening, whereby the casing may be positioned on a suitable securing nail or the like.

The casing when moulded is formed with an enlargement 9 providing an outer convex reflecting surface and an inner concaved surface for the reception of the mercury tube which is indicated at 10.

This mercury tube 10 is carried by the disk 11 which is of a diameter equal to the interior diameter of the casing and carries suitable markings and graduations with which the mercury in the tube 10 cooperates to register the temperature.

An opening is formed adjacent to the lower edge of the disk 11 through which the lower end 12 of the mercury tube extends, there being provided an opening 13 formed in the circular wall 7 directly below the end 12 of the mercury tube so that the air in the room in which the thermometer is positioned may have direct contact with the end 12 of the mercury tube.

Securing bands indicated at 14 are secured to the disk 11, and are provided for gripping the tube 10 to hold the tube in position on the disk 11. From the foregoing it will be obvious that the present invention provides a casing of transparent material which is formed with a magnifying section disposed directly over the mercury tube to magnify the mercury in the tube to render the device readily and easily readable.

While I have shown and described the casing as circular in formation, it is to be understood that the design and shape of the body portion may be changed without departing from the spirit of the invention.

I claim:—

1. A thermometer casing formed of transparent material and having a magnifying portion formed integral therewith and disposed substantially centrally thereof.

2. A thermometer casing including a transparent body portion, a magnifying section formed integral with the body portion, and a disk carrying indicating characters positioned within the body portion, a mercury tube carried by the disk, and said mercury tube adapted to be positioned behind the magnifying section.

3. A thermometer casing including a transparent body portion, said body portion having a rearwardly extended wall, a disk positioned within the body portion and carrying a mercury tube, said body portion having an enlarged portion disposed over the mercury tube to magnify the tube, and said wall having a cut out portion to admit air to the body portion.

In testimony that I claim the foregoing as my own, I have hereto affixed my signature.

ADELBERT ANDREW BENEDICT.